Nov. 3, 1959   R. E. SCOTT   2,910,750
FASTENER
Filed Aug. 9, 1956

INVENTOR
ROBERT E. SCOTT
BY Strauch, Nolan & Neale
ATTORNEYS

United States Patent Office 2,910,750
Patented Nov. 3, 1959

2,910,750
FASTENER

Robert E. Scott, Bloomfield Township, Oakland County, Mich., assignor to Gagnier Fibre Products Company, Oak Park, Mich., a corporation of Michigan Application August 9, 1956, Serial No. 603,032

13 Claims. (Cl. 24—73)

This invention relates to fasteners and particularly to special fasteners for securing molding strip or the like to an automobile side wall or the like.

The problem of adequately securing molding strip to a support structure has been a matter of attempted solution for many years as evidenced by the large number of patents already granted on the subject. All previously proposed fasteners have been subject to one objection or another, such as cost of manufacture, complexity of design, inadequate strength, unreliability, difficulty of installation, etc. The fastener of the invention represents a major step toward solution of the problem in that it is inexpensively made from two pieces of round stock or wire specially formed and combined, holds strongly in assembly and is adapted for different and changing width molding strips.

It is therefore the major object of this invention to provide a novel fastener for molding strips and the like wherein the fastener head is formed from one piece of stock and the stud is formed from another piece of stock and the two are rigidly interlocked.

It is a further object of the invention to provide a novel fastener wherein the head is a loop structure provided with a spring arm and formed from a single length of wire, and the stud is a straight length of stock formed at one end to interlock with the head.

A further object of the invention is to provide a molding or like fastener wherein the head is a narrow-waisted loop structure and the stud has one end clamped upon the head waist.

A further object of the invention is to provide a novel fastener head structure formed of a looped structure of round cross section relatively stiff wire terminating at one end in a spring arm projecting away from the loop structure.

A further object of the invention is to provide a novel fastener head structure made of a single looped length of round cross section wire terminating in a projecting spring arm that is flattened at its juncture with the loop.

Further objects of the invention will appear as the description proceeds in connection with the appended claims and the annexed drawings wherein:

Figure 3:
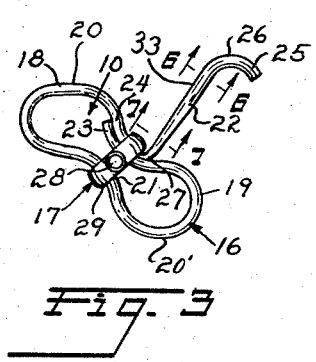
Figure 3 is a bottom plan view of the relaxed fastener of Figure 1.
Figure 4:
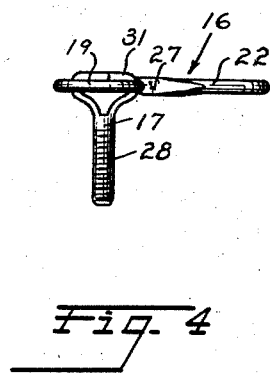
Figure 4 is a side view of the same fastener.
Figure 5:
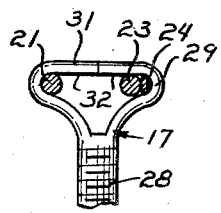
Figures 6, 7:

Figure 5 is enlarged view of the interlock between the fastener head and stud; and Figures 6 and 7 are sections on lines 6—6 and 7—7 of Figure 3 to show the changing cross section of the head wire.

Figure 1:
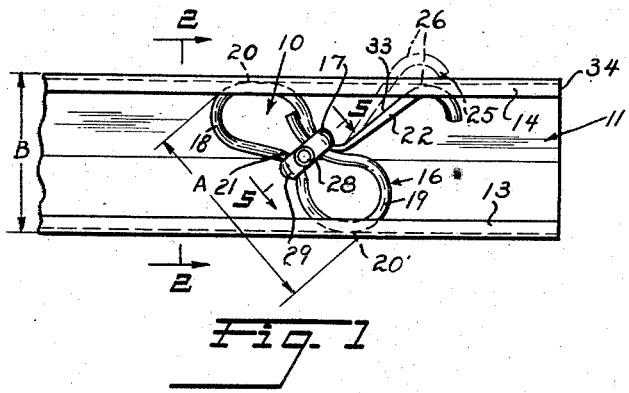
Figure 1 is a bottom plan view showing a fastener according to a preferred embodiment of the invention mounted in a molding strip.
Figure 2:
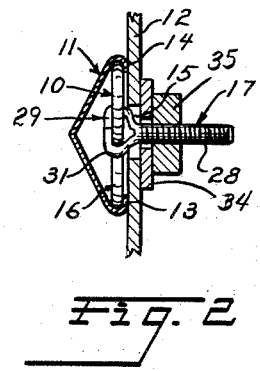
Figure 2 is a section on line 2—2 of Figure 1 and showing the manner that the fastener attaches the strip onto a support.

Figures 1 and 2 show the fastener 10 of the preferred embodiment of the invention in its operative position for holding a molding strip 11 against a support 12. Molding strip 11 is of light weight bendable sheet metal with inturned side edges forming flanges 13 and 14 that define oppositely facing channels in the strip. Support 12 is a rigid metal plate having spaced openings 15 for receiving the fastener studs as will appear. A series of fasteners 10 and openings 15 are provided along the desired length of molding strip but only one will be described to illustrate the invention.

Fastener 10 is a composite article made up of a special head structure 16 secured to a special stud structure 17.

The head structure 16 is formed from a single length of metal, preferably stiff bendable wire that will accept and retain a given shape, and comprises essentially loops 18 and 19 connected by a narrower waist section 21 and having a spring arm 22 extending angularly outwardly from said waist section. One end of the wire at 23 extends coextensively with an intermediate portion 24 at one side of the waist, and arm 22 is an integral bent extension of that portion 24 which in the relaxed Figure 3 condition of the fastener is disposed approximately at right angles to the waist 21. The entire head structure consisting of the loops, waist and spring arm, is a stiff flat structure that lies essentially in a plane, so that as shown in Figure 2 the loops may snugly seat in the opposed molding channels.

The head loops are externally formed with smooth arcuate bearing surfaces 20 and 20' that engage the channel bottoms in the assembly. Spring arm 22 is formed at its outer free end with a bent terminal 25 providing a smooth arcuate bearing surface 26 which snugly and slidably engages in one of the channels of the molding strip in the assembly.

The head structure is formed preferably of a single length of round cross section wire which is flattened for a material length in the contiguous sections of portion 24 and arm 22 joined by the sharp bend 27. The plane of this flat wire section is perpendicular to the plane of the head structure. This construction will be defined hereinafter as a flat section of the wire at the junction bend between the head loop and the spring arm. By providing this flat junction bend the rigidity of the round stiff wire is reduced at this area and a controlled more resilient spring action is provided for arm 22.

The stud 17 comprises a threaded straight rigid shank 28 formed with an attachment section 29 embracing the head waist 21. Preferably the stud is made of a rigid length of round stock of larger diameter than the head wire threaded along most of its length at 28 and split at the non-threaded end to provide two J-shaped extensions which cooperate to form a relatively tight closed rigid loop 31 clamped about waist 21, as shows in enlarged detail in Figure 5. This attachment of the stud to the head provides a stud that extends at a desired angle, usually right angles, to the head and prevents the stud from rotation on its axis relative to the head. Since the inner surfaces of loop 31 are flat at 32 and the loop is snugly secured about waist 21, there is no appreciable rocking of the stud to change its angular relationship to the head plane. Essentially therefore the stud 17 is fixed or interlocked at its non-threaded end to the head loop structure.

In practice each fastener 10 is inserted into the end of the molding strip, from the right in Figure 1, with the head loops 18 and 19 disposed in the opposite molding channels and the bearing surfaces 20 and 20' in sliding contact with the channel bottoms. At the beginning the unstressed spring arm 22 will extend at the angle shown in phantom lines in Figure 1 but as the head loop structure slides along the channels the smooth straight back face 33 of arm 22 encounters the end edge 34 of the molding strip and effectively cams arm 22 to rock about its junction bend at 27 sufficiently to enable entry of the arm terminal 25 into the channel containing loop 18, and thereafter the head slides along the channels to its desired position where it is held frictionally and resiliently by the action of now stressed spring arm 22.

The foregoing head loop structure is essentially rigid in its plane and its dimension A between bearing surfaces 20 and 20' is greater than the width B between the opposed molding channels, so that in the assembly the stressed spring arm 22 biases the head loop structure clockwise in Figure 1 to urge both bearing surfaces 20 and 20' against their respective channel bottoms. By providing arcuate changing curvature surfaces at 20 and 20' it will be seen that a single fastener size may be made to fit with different width molding strips or with molding strips where the channels converge or diverge along the strip length.

As shown in Figure 2 for assembly the fasteners frictionally located along the molding strip are aligned with support opening 15 through which the studs are extended to receive washers 34 and nuts 35 which when drawn tight draw the molding strip against the support with flanges 13 and 14 tightly gripped between the head and support.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a molding or like fastener, a planar head structure adapted to be slidably inserted along a flanged molding strip and consisting of a length of metal formed to provide oppositely extending substantially closed molding engaging loop formations externally formed with molding engaging surfaces disposed on opposite edges of said head and terminating in an angularly projecting spring arm adapted to bear on said molding and tightly urge said surfaces into molding engagement, and an attachment stud mounted upon and non-rotatably interlocked with said head structure between said loops.

2. In a fastener, a generally planar stiff head loop structure adapted to be slidably inserted along a flanged molding strip and formed with a relatively narrow waist portion and externally formed on opposite edges with external molding engaging surfaces, a spring arm fixed to and extending angularly from said waist portion and adapted for molding engagement for urging said surfaces into tight engagement with said molding, and a stud projecting angularly with respect to said head structure plane, said stud being non-rotatably interlocked at one end to said head structure.

3. In a fastener, a generally flat head unit adapted to be slidably inserted along a flanged molding strip and consisting of a single length of stiff wire formed to provide a substantially closed rigid loop structure and terminating in a single spring arm extending from one side of said loop structure, said head unit having on opposite edges external molding engaging surfaces of changing slope and said spring arm when compressed by engagement with said molding being adapted to urge said surfaces into tight engagement with the molding, and a rigid attachment stud having one end non-rotatably interlocked with said loop structure adjacent the junction of said spring arm with said loop structure.

4. In a fastener, a generally planar head unit adapted to be slidably inserted along a flanged molding strip and consisting of a single length of wire formed into a substantially closed loop structure having an intermediate waist portion, and a single spring arm projecting from said waist portion as an integral outwardly bent end extension of said length of wire, and a rigid stud having an end non-rotatably interlocked with said loop structure at said waist portion, said head unit having external molding bearing surfaces on opposite edges and said spring arm being adapted to rock said head unit about the axis, said stud to urge said surfaces into engagement with said molding.

5. In a fastener, a generally planar flat head unit adapted to be slidably inserted along a flanged molding strip and consisting of a single length of wire formed to provide opposite loops connected by a reduced waist portion and having one end of the wire projecting outwardly from said waist portion to provide a spring arm for biasing the head in assembly with a molding or the like, and a rigid stud having one end secured non-rotatably to said head unit at said waist portion, said loops having external molding bearing surfaces disposed on opposite edges of said head unit and said spring arm being adapted to rock said head unit about the axis of said stud into engagement with said molding.

6. In the fastener defined in claim 5, said wire having side by side sections at said waist portions and said spring arm being an extension of one of said sections.

7. In the fastener defined in claim 6, said wire being essentially of round cross-section but being flattened at the juncture of said one section and the spring arm.

8. In the fastener defined in claim 5, said stud having its one end clamped about said waist portion of the head.

9. In the fastener defined in claim 8, said stud having said one end split and with the split parts bent toward each other to embrace said waist.

10. In a fastener, a rigid flat head adapted to be slidably inserted along a flanged molding strip and formed of looped round cross-section wire and having a reduced waist portion and a single spring arm formed by an outwardly bent end of said wire, said wire projecting away from said waist portion and being flattened at the juncture of the arm with said head to provide an effective resilient hinge permitting flexure of said arm in the plane of the head, and a rigid stud secured non-rotatably to said head at said waist portion and projecting at right angles to said head, said head being formed with molding engaging surfaces on opposite edges and said spring arm being adapted to engage the molding to urge rocking of said head about the axis of said stud to tightly engage said surfaces with the molding.

11. A molding fastener consisting essentially of a generally planar head portion adapted to be slidably positioned along a flanged molding strip and an attachment stud portion, said head portion being a single length of wire formed to provide a generally oblong rigid structure having substantially diagonally opposite external edge bearing surfaces adapted to engage the molding to be held thereby, and an integral extension of one end of said wire projecting angularly from said structure to provide a spring arm for rotatively biasing the head structure to suit the molding width, and said stud portion being a rigid element fixed at one end to said head structure approximately centrally thereof and projecting at right angles to the plane thereof.

12. The molding fastener defined in claim 11 wherein the other end of said wire terminates and is anchored in the head structure adjacent the region said spring arm extends from said head structure.

13. The molding fastener defined in claim 12 wherein the stud has a head non-rotatably secured to the wire ends within the head structure.

(References on following page)

References Cited in the file of this patent

UNITED STATES PATENTS

| | | | |
|---|---|---|---|
| Re. 23,876 | Poupitch | Sept. 21, | 1954 |
| 842,782 | Goerdes | Jan. 29, | 1907 |
| 1,331,611 | Bott | Feb. 24, | 1920 |
| 2,192,344 | Fernberg | Mar. 5, | 1940 |
| 2,218,832 | Schroeder | Oct. 22, | 1940 |
| 2,625,357 | Atkinson | Jan. 13, | 1953 |
| 2,695,434 | Bedford | Nov. 30, | 1954 |
| 2,695,435 | Bedford | Nov. 30, | 1954 |

FOREIGN PATENTS

| 4,393 | Great Britain | Feb. 22, 1910 |
|---|---|---|

UNITED STATES PATENT OFFICE
CERTIFICATE OF CORRECTION

Patent No. 2,910,750

Robert E. Scott

November 3, 1959

It is hereby certified that error appears in the printed specification of the above numbered patent requiring correction and that the said Letters Patent should read as corrected below.

Column 3, line 50, after "interlocked" insert -- at one end --.

Signed and sealed this 26th day of April 1960.

(SEAL)
Attest:

KARL H. AXLINE
Attesting Officer

ROBERT C. WATSON
Commissioner of Patents